US012625997B2

(12) United States Patent
Radhakrishnan et al.

(10) Patent No.:  US 12,625,997 B2
(45) Date of Patent:      May 12, 2026

(54) AUTHENTICATING A HOST COMPUTER SYSTEM TO ACCESS A DATA STORAGE DEVICE

(71) Applicant: Sandisk Technologies, Inc., Milpitas, CA (US)

(72) Inventors: Bharath Radhakrishnan, Georgetown (MY); Ramanathan Muthiah, Bangalore (IN); Uthayarajan Rasalingam, Nibong Tebal (MY)

(73) Assignee: Sandisk Technologies, Inc., Milpitas, CA (US)

( * ) Notice: Subject to any disclaimer, the term of this patent is extended or adjusted under 35 U.S.C. 154(b) by 120 days.

(21) Appl. No.: 18/753,968

(22) Filed: Jun. 25, 2024

(65) Prior Publication Data

US 2025/0390597 A1      Dec. 25, 2025

(51) Int. Cl.
*G06F 21/62*          (2013.01)
*G06F 12/02*          (2006.01)

(52) U.S. Cl.
CPC ...... *G06F 21/6218* (2013.01); *G06F 12/0246* (2013.01)

(58) Field of Classification Search
CPC .......................... G06F 21/6218; G06F 12/0246
USPC ........................................................ 726/27
See application file for complete search history.

(56) References Cited

U.S. PATENT DOCUMENTS

| | | | | |
|---|---|---|---|---|
| 5,737,600 | A * | 4/1998 | Geiner | G06F 16/23 |
| 5,799,089 | A * | 8/1998 | Kuhn | H04L 9/0637 |
| | | | | 380/37 |
| 7,941,579 | B2 | 5/2011 | Uno | |
| 9,858,960 | B2 | 1/2018 | Cho et al. | |
| 10,642,962 | B2 | 5/2020 | Amaral Cid et al. | |
| 2003/0033523 | A1* | 2/2003 | McNulty | H04L 63/126 |
| | | | | 713/168 |
| 2003/0120885 | A1* | 6/2003 | Bonola | G06F 12/023 |
| | | | | 711/170 |
| 2008/0114981 | A1* | 5/2008 | Hars | G06F 21/80 |
| | | | | 713/170 |

* cited by examiner

*Primary Examiner* — Zi Ye
(74) *Attorney, Agent, or Firm* — Patent Law Works LLP

(57) ABSTRACT
A method for authenticating a host computer system to access a data storage device (DSD) comprising a non-volatile storage medium including a plurality of blocks, the method comprising: receiving, from a computer program on the host computer system, an initial read request to read a block of the plurality of blocks and in response sending information from the block to the host computer system; iteratively receiving, from the computer program on the host computer system, a subsequent read request to read a subsequent block of the plurality of blocks based on the information sent from the block of a previous response; and in each iteration sending information from the subsequent block to the host computer system or terminating the iterative process in response to determining that each block of the plurality of blocks has been read; and determining the host computer system is authenticated in response to determining one or more conditions are met, wherein the one or more conditions include determining that each block of the plurality of blocks has been read.

20 Claims, 9 Drawing Sheets

200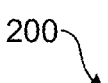

```
┌─────────────────────────────────────────┐
│  Receive, from a host computer system,   │
│  an initial read request to read a block │
│  of a plurality of blocks of a storage   │
│  medium of a DSD                         │
│                  202                     │
└─────────────────────────────────────────┘
                    │
                    ▼
┌─────────────────────────────────────────┐
│  Send Information from the block to the  │
│  host computer system                    │
│                  204                     │
└─────────────────────────────────────────┘
                    │
                    ▼
┌─────────────────────────────────────────┐
│  Iteratively receive, from the computer  │
│  program, a subsequent read request to   │
│  read a subsequent block of the          │
│  plurality of blocks based on the        │
│  information sent from the block of a     │
│  previous response                       │
│                  206                     │
└─────────────────────────────────────────┘
                    │
                    ▼
┌─────────────────────────────────────────┐
│  Send information from the subsequent    │
│  block to the host computer system       │
│                  207                     │
└─────────────────────────────────────────┘
```

Next iteration

Are one or more conditions met: has each block been read
208

No

Yes

```
┌─────────────────────────────────────────┐
│  Terminate the iterative process         │
│                  210                     │
└─────────────────────────────────────────┘
                    │
                    ▼
┌─────────────────────────────────────────┐
│  Determine the host computer system is   │
│  authenticated                           │
│                  212                     │
└─────────────────────────────────────────┘
```

Fig. 2a

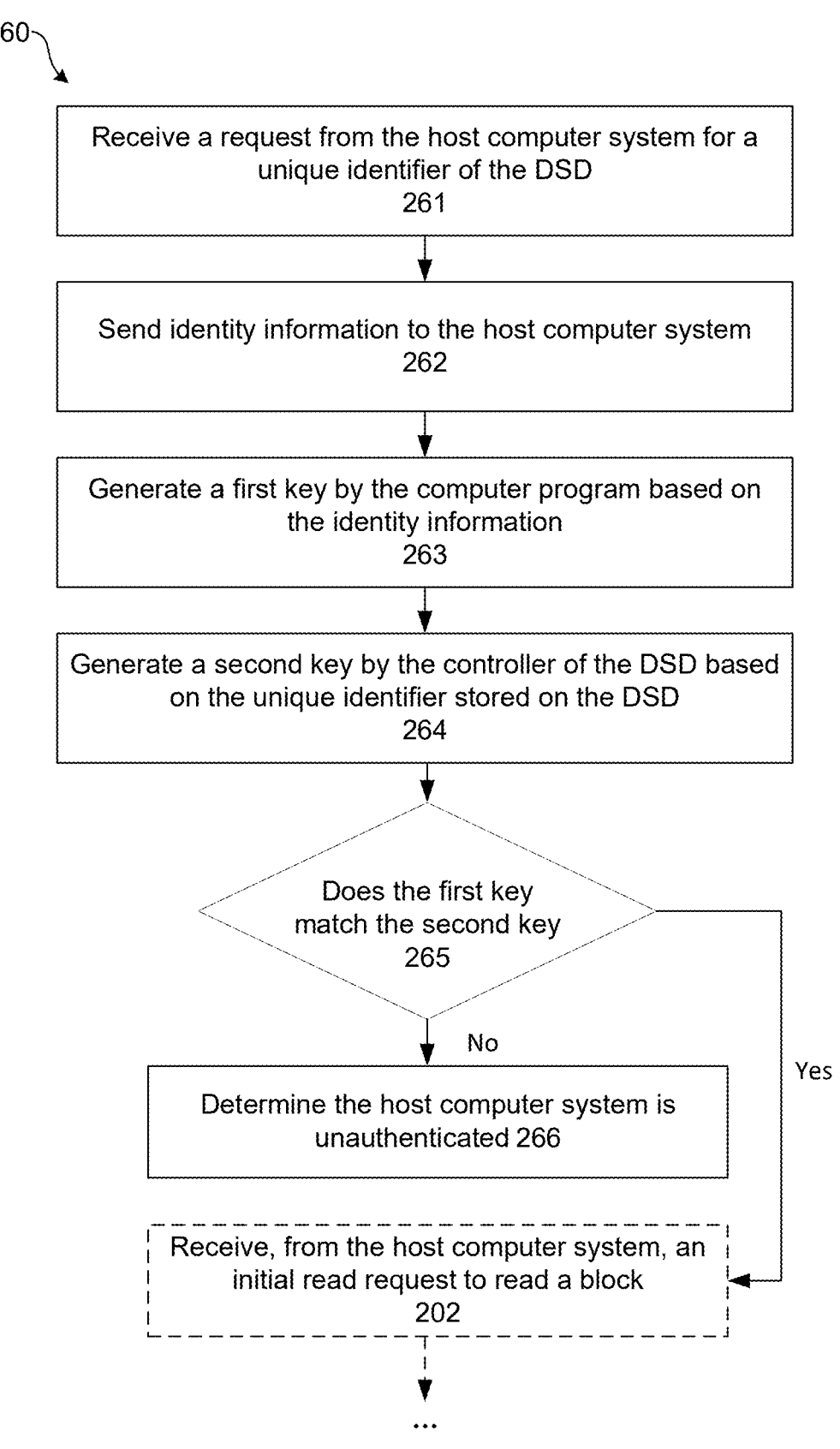

260

Receive a request from the host computer system for a unique identifier of the DSD
261

Send identity information to the host computer system
262

Generate a first key by the computer program based on the identity information
263

Generate a second key by the controller of the DSD based on the unique identifier stored on the DSD
264

Does the first key match the second key
265

No

Yes

Determine the host computer system is unauthenticated 266

Receive, from the host computer system, an initial read request to read a block
202

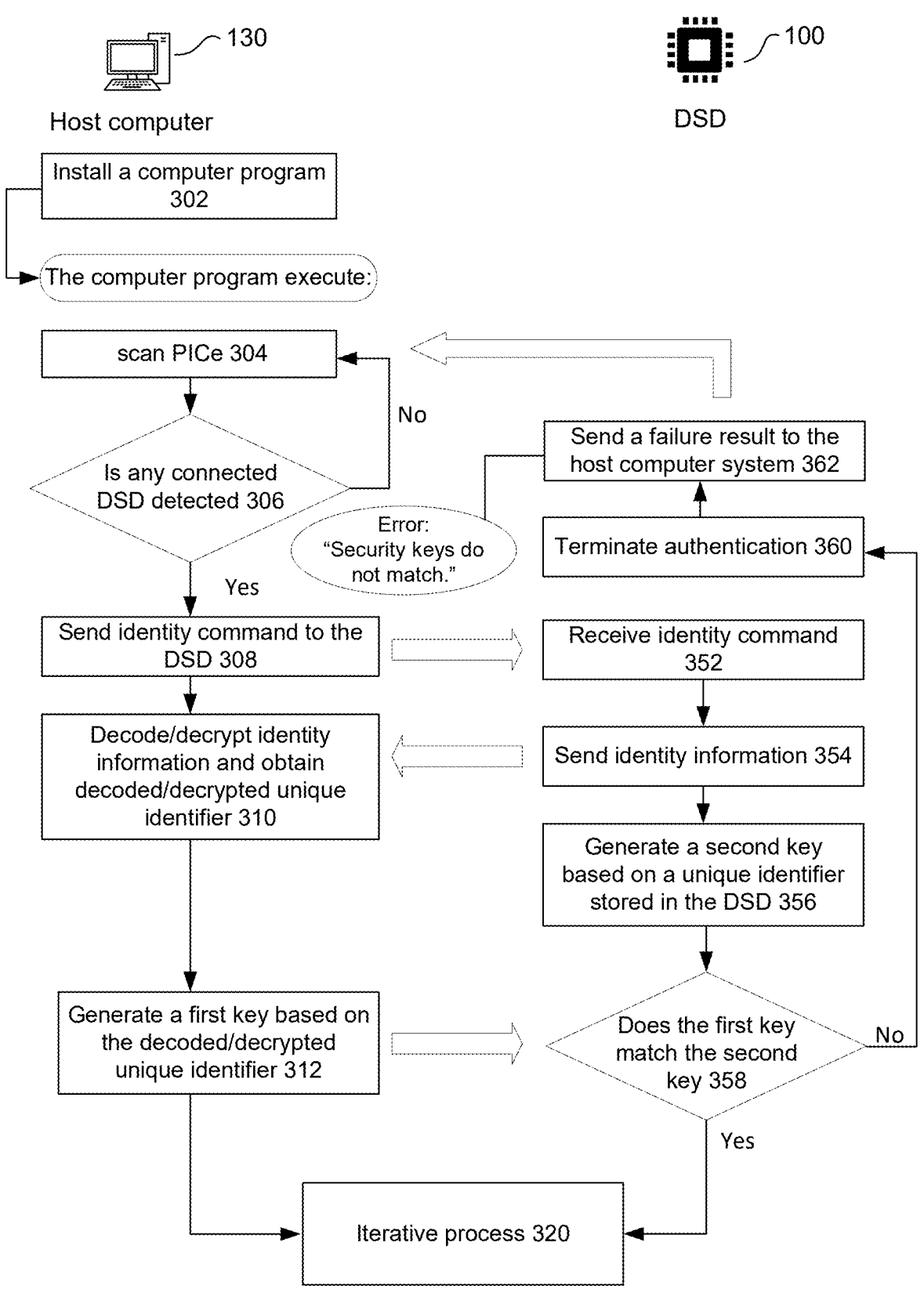

Host computer — 130

DSD — 100

Install a computer program 302

The computer program execute:

scan PICe 304

Is any connected DSD detected 306 — No

Send a failure result to the host computer system 362

Error: "Security keys do not match."

Terminate authentication 360

Yes

Send identity command to the DSD 308

Receive identity command 352

Decode/decrypt identity information and obtain decoded/decrypted unique identifier 310

Send identity information 354

Generate a second key based on a unique identifier stored in the DSD 356

Generate a first key based on the decoded/decrypted unique identifier 312

Does the first key match the second key 358 — No

Yes

Iterative process 320

Fig. 3a

Permutation 1      Permutation 2      Permutation 3     ...

600

The DSD being in an initialization state
602

The DSD being in a recovering state from
a sleep state
604

The DSD being in between two logical
states fitting one or more requirements
606

A pre-defined timing condition met
608

The DSD being in an abnormal state
609

Trigger one or more
authentication process
610

AUTHENTICATING A HOST COMPUTER SYSTEM TO ACCESS A DATA STORAGE DEVICE

TECHNICAL FIELD

This disclosure relates to authenticating a host computer system to access a data storage device (DSD) by a computer program to prevent unauthenticated host computer systems from accessing the storage device.

BACKGROUND

Data storage devices (DSDs) are electronic devices with the capability to store information in the form of digital data. DSDs are typically deployed as an integrated part of, or as a removable component configured to interface with, a mobile computing system for the purpose of improving the data transmission and storage capabilities of the computing system. From the perspective of the computing system, a data storage device (DSD) is typically implemented as a block storage device where the data stored is in the form of one or more blocks, being sequences of bytes or bits having a maximum length, referred to as block size.

DSDs are commonly used to supplement the data storage capabilities of a computer system. For example, DSDs are often standalone physical devices that house an internal storage component, such as a hard disk drive (HDD) or a solid state drive (SSD), that provides a host computer system with an additional portion of non-volatile memory (i.e., the volume of the drive) in which to store digital data. These drive-type devices are connectable to the host computer system via a data path operating over a particular connectivity protocol (e.g., via a Universal Serial Bus (USB) cable or Peripheral Component Interconnect Express (PCIe) bus). In response to being connected to the host computer system, the host computer system recognizes the drive as a block data storage device such that a user of the device may access the storage of the drive via the data path (e.g., through operations of the host computer system). Access to the drive typically enables one or more users of the host computer system and computer programs on the host computer system to access (e.g., read, write and/or modify) user data stored on the drive.

It is common that, over time, as the volume of data getting stored on DSDs increases, the risk of user content data getting hijacked or compromised also escalates, potentially resulting in significant losses for the end user. Therefore, it is desirable to secure the user content data on a DSD against access by unauthenticated, such as malicious, host computer systems and maintain trusted connections between authenticated host computer systems and the DSD, thereby preventing data access by un-trustworthy host computer systems and minimizing the risk of data loss.

SUMMARY

Disclosed herein is a method for authenticating a host computer system to access a data storage device (DSD) comprising a non-volatile storage medium including a plurality of blocks, wherein the method comprises: receiving, from a computer program on the host computer system, an initial read request to read a block of the plurality of blocks and in response sending information from the block to the host computer system; iteratively receiving, from the computer program on the host computer system, a subsequent read request to read a subsequent block of the plurality of blocks based on the information sent from the block of a previous response; and in each iteration sending information from the subsequent block to the host computer system or terminating the iterative process in response to determining that each block of the plurality of blocks has been read; and determining the host computer system is authenticated to access the DSD in response to determining one or more conditions are met, wherein the one or more conditions include determining that each block of the plurality of blocks has been read.

In some embodiments, determining that each block of the plurality of blocks has been read comprises determining the subsequent block to be read is the block of the initial read request.

In some embodiments, the one or more conditions further include determining that every block of the plurality of blocks has been read once.

In some embodiments, the subsequent read request is generated by the computer program, and wherein the generation of the subsequent read request comprises: retrieving address information of the subsequent block from the information sent from the block of the previous response; and generating the subsequent read request to the subsequent block to which the address information directs.

In some embodiments, retrieving the address information of the subsequent block from the information sent from the block of the previous response comprises: parsing the information sent from the block to retrieve a combined key, the combined key associated with combination information on a channel, a die, a plane and a block of the non-volatile storage medium of the DSD; and decoding the combined key for a physical address of a subsequent page of the subsequent block.

In some embodiments, the generation of the subsequent read request further comprises sending a read request to the subsequent page of the subsequent block.

In some embodiments, the iterative process further comprises: determining whether the subsequent read request was sent within a time interval, in response to determining that the subsequent read request was sent within the time interval, allowing the subsequent read request to the subsequent block, and in response to determining that the subsequent read request was not sent within the time interval, rejecting the subsequent read request, terminating the iterative process, and/or determining the host computer system is unauthenticated.

In some embodiments, the method further comprises generating an arbitrary timestamped identifier configured to define the time interval, a length of the time interval being arbitrary as defined by the arbitrary timestamped identifier.

In some embodiments, the one or more conditions further include determining that each block of the plurality of blocks has been read in a predetermined order.

In some embodiments, the predetermined order is one of a plurality of permutations, each permutation indicating an order for traversing the plurality of blocks.

In some embodiments, the method further comprises performing a first authentication before executing the iterative process, the first authentication comprising: receiving a request from the host computer system for a unique identifier of the DSD and in response sending identity information to the host computer system; generating a first key, by the computer program, based on the identity information; generating a second key, by a controller of the DSD, based on the unique identifier stored on the DSD; determining, by the controller of the DSD, whether the first key matches the second key; in response to determining the first key does not match the second key, determining the host computer system is unauthenticated; and in response to determining the first key matches the second key, executing the iterative process.

In some embodiments, generating, by the computer program, the first key based on the identity information comprises: decoding and/or decrypting, by the computer program, the identity information for the unique identifier; generating, by the computer program, the first key based on the decoded and/or decrypted unique identifier; and sending, by the computer program, the first key to the controller of the DSD.

In some embodiments, generating the first key comprises hashing the decoded and/or decrypted unique identifier, and/or wherein generating the second key comprises hashing the unique identifier stored on the DSD.

In some embodiments, the method further comprises performing a further authentication, wherein the further authentication comprises: detecting an error event caused by one or more changes in one or more components of the DSD, wherein the error event indicates that: reading one or more blocks of the plurality of blocks in the predetermined order did not succeed; and/or the iterative process has not been executed; and in response to the error event is detected, restricting access by the host computer system to the DSD.

In some embodiments, the method is triggered in one or more scenarios, the one or more scenarios comprising: the DSD being in an initialization state; the DSD being in a recovering state from a sleep state; the DSD being in between two logical states fitting one or more requirements; a predefined timing condition met; and/or the DSD being in an abnormal state, wherein the abnormal state includes that a number of data access requests attempted by the host computer system has exceeded a threshold value.

In some embodiments, the method further comprises encrypting data transmitted between the host computer system and the DSD; and decrypting the encrypted data, by the host computer system and/or the DSD.

Disclosed herein is also a data storage device (DSD) comprising: a non-volatile storage medium configured to store data, the non-volatile storage medium including a plurality of blocks; a data path configured to transmit at least data between the non-volatile storage medium of the DSD and a host computer system; and one or more processors, individually or in combination, configured to: receive, from a computer program on the host computer system, an initial read request to read a block of the plurality of blocks and in response sending information from the block to the host computer system; iteratively receive, from the computer program on the host computer system, a subsequent read request to read a subsequent block of the plurality of blocks based on the information sent from the block of a previous response; and in each iteration sending information from the subsequent block to the host computer system or terminating the iterative process in response to determining that each block of the plurality of blocks has been read; and determine the host computer system is authenticated in response to determining one or more conditions are met, wherein the one or more conditions include determining that each block of the plurality of blocks has been read.

Disclosed herein is further a computer-implemented method configured to be performed by a computer program on a host computer system for authenticating the host computer system to access a data storage device (DSD) comprising a non-volatile storage medium including a plurality of blocks, wherein the computer-implemented method comprises: sending an initial read request to read a block of the plurality of blocks to the DSD to read a block of the plurality of blocks and in response receiving information from the block; and iteratively sending a subsequent read request to read a subsequent block of the plurality of blocks to the DSD based on the information received from the block of a previous response; and in each iteration receiving information from the subsequent block, or terminating the iterative process in response to the DSD determining that each block of the plurality of blocks has been read, wherein the DSD determining the host computer system is authenticated in response to determining one or more conditions are met, wherein the one or more conditions include the DSD determining that each block of the plurality of blocks has been read.

In addition, disclosed herein is a non-transitory computer-readable medium for authenticating a host computer system to access a data storage device (DSD) comprising a non-volatile storage medium including a plurality of blocks, the non-transitory computer-readable medium comprising instructions that, when executed by one or more processors, cause the one or more processors to perform, individually or in combination, operations comprising: sending an initial read request to read a block of the plurality of blocks to the DSD and in response receiving information from the block; and iteratively sending a subsequent read request to read a subsequent block of the plurality of blocks to the DSD based on the information received from the block of a previous response; and in each iteration sending the subsequent read request to the DSD and receiving information from the subsequent block, or terminating the iterative process in response to the DSD determining that each block of the plurality of blocks has been read, wherein the DSD determining the host computer system is authenticated in response to determining one or more conditions are met, wherein the one or more conditions include the DSD determining that each block of the plurality of blocks has been read.

Disclosed herein is further a data storage device (DSD) comprising: means for storing data; means for transmitting at least data between a host computer system and the data storage device; means for receiving, from a computer program on the host computer system, an initial read request to read a block of the plurality of blocks and in response sending information from the block to the host computer system; means for iteratively receiving, from the computer program on the host computer system, a subsequent read request to read a subsequent block of the plurality of blocks based on the information sent from the block of a previous response; and in each iteration sending information from the subsequent block to the host computer system or terminating the iterative process in response to determining that each block of the plurality of blocks has been read; and means for determining the host computer system is authenticated in response to determining one or more conditions are met, wherein the one or more conditions include determining that each block of the plurality of blocks has been read.

BRIEF DESCRIPTION OF DRAWINGS

Some embodiments are described herein below with reference to the accompanying drawings, wherein:

FIG. 2a is a flow diagram of a process for authenticating a host computer system to access a data storage device (DSD) according to one embodiment;

FIG. 2d is a flow diagram of an additional process for authenticating a host computer system to access a data storage device (DSD) based on a unique identifier of the DSD according to one embodiment;

FIG. 3a is a flow diagram of a process for authenticating the host computer system to access the data storage device (DSD) from the perspective of both the host computer system and the DSD according to one embodiment;

DESCRIPTION OF EMBODIMENTS

Data storage devices (DSDs) may be subject to unauthenticated and/or suspicious access to data stored in the DSDs. Typically, one or more host computer systems execute data access operations to a data storage device (DSD) to access user content data on the DSD. The one or more host computer systems may be either genuine or malicious, and the malicious host computer systems may bring the risk of user content data being compromised and cause significant losses for the end user.

Typically, the approaches for authenticating host computer systems to access a DSD involve single-time authentication, which is commonly performed once at the initial connection between the host computer system and the DSD. However, single-time authentication does not provide continuous verification of the host's identity or behavior. If the host computer system becomes compromised after the initial authentication, the DSD remains vulnerable. Without continuous security authentication, it is difficult to monitor access events in real time to ensure that the host computer system accessing the DSD is still legitimated and authenticated. Moreover, such approaches based on single-time authentication provide limited capability to revoke or update permissions dynamically based on the host's ongoing actions.

Disclosed herein are methods and systems for authenticating host computer systems to access a DSD, which ameliorate one or more of the aforementioned drawbacks, or any other drawbacks of the prior art, or that at least provide a useful alternative.

Overview

Figures 1A, 1B:
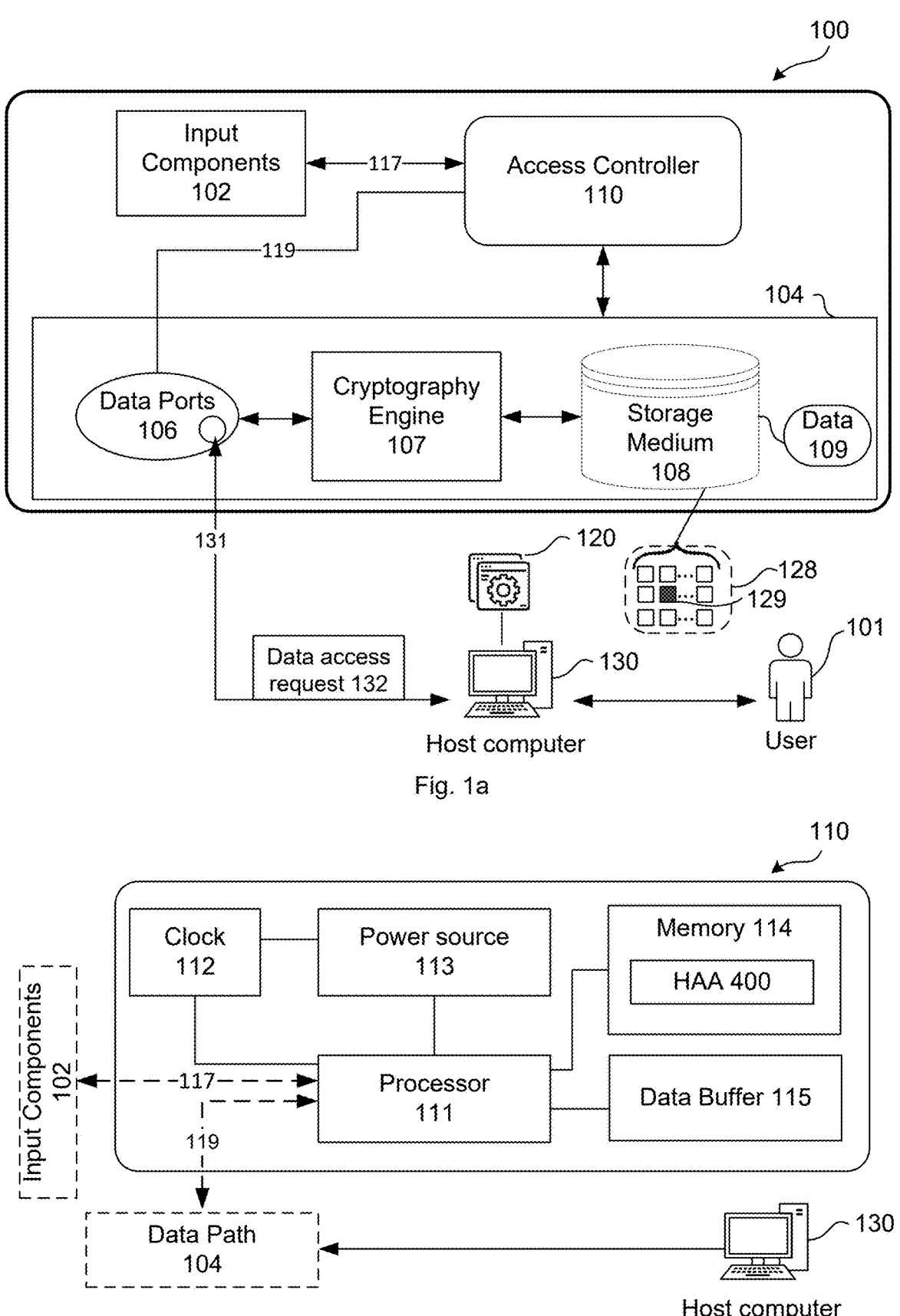
FIG. 1a illustrates an example data storage device (DSD) according to one embodiment.
FIG. 1b illustrates a block diagram of an access controller of the DSD according to one embodiment.

FIG. 2a illustrates a method 200 for authenticating a host computer system to access a data storage device (DSD). FIGS. 1a and 1b illustrate an example DSD 100 and a system for implementing the method 200, comprising a computer program 120 on a host computer system 130, a storage medium 108 of the DSD 100 comprising a plurality of blocks 128 that store user content data 109, an access controller 110 of the DSD 100, a data path 104 configured to transmit at least data between the storage medium 108 of the DSD 100 and a host computer system 130. The data path 104 comprises a data port 106 configured to transmit data between a host computer system 130 and the DSD 100 (e.g., via a data flow 131).

The method 200 comprises the DSD 100 receiving 202 an initial read request to read a block 129 of the plurality of blocks 128 from a computer program 120 on the host computer system 130. The block 129 can be any one of the plurality of blocks 128. In response, the DSD 100 sends 204 information from the block 129 to the host computer system 130. The information is stored on the block 129 and enables the computer program 120 to send a second read request to a second block of the plurality of blocks 128, which is different from the block 129.

The method 200 further comprises an iterative process. The iterative process comprises iteratively receiving 206, from the computer program 120 on the host computer system 130, a subsequent read request to read a subsequent block of the plurality of blocks 128 based on the information sent from the block of a previous response. Preferably, the term "previous response" refers to the response from the immediately preceding iteration. For example, in a kth iteration (where k is a natural number greater than 1), the DSD 100 may receive, from the computer program 120, a kth read request to read a kth block of the plurality of blocks 128 based on the information sent from the (k−1)th block of the previous response, i.e., the (k−1)th response in the (k−1)th iteration. The kth block may be different from the first to (k−1)th blocks.

The method 200 also comprises, in each iteration, the DSD 100 either sending 207 information from the subsequent block to the host computer system 130, or terminating 210 the iterative process in response to determining that each block of the plurality of blocks 128 has been read. For example, in kth iteration, the DSD 100 may determine 220 whether each block of the plurality of blocks 128 has been read. In response to the DSD 100 determining 208 that each block of the plurality of blocks 128 has been read, the DSD 100 terminates 210 the iterative process, where k times iterations have been executed.

In response to the DSD 100 determining that each block of the plurality of blocks 128 has not been read, the DSD 100 continues the iterative process 206, 207 and 208 by sending 207 information from the block that has been read in the current iteration to the host computer system 130. For example, the DSD 100 sends information from the kth block to the host computer system 130 for the (k+1)th iteration. In this case, in the (k+1)th iteration, the DSD receives, from the computer program 120, a (k+1)th read request to read a (k+1)th block of the plurality of blocks 128 based on the information sent from the kth block of the previous response (i.e., the kth response). The DSD 100 then executes step 207, which is similar to that in the kth iteration.

The DSD 100 and the computer program 130 iteratively execute the above steps 206 to 208 until the DSD 100 determines that each block of the plurality of blocks 128 has been read and terminates 210 the iterative process.

The method 200 further comprises in response to determining 208 one or more conditions are met, determining 212 the host computer system is authenticated to access the DSD, wherein the one or more conditions include determining that each block of the plurality of blocks 128 has been read.

In some embodiments, determining that each block of the plurality of blocks 128 has been read comprises determining the subsequent block to be read is the block of the initial read request, for example, block 129 in the above example.

In some embodiments, the method 200 may further comprise additional authentication processes that are independent of the above iterative authentication process, thereby creating multiple levels of authentication to further enhance the security of the DSD.

Since the authentication process can be automatically performed by the computer program 120 on the host computer system 130 and the DSD 100, no extra user input to the host computer system 130 and/or the DSD 100 is required to complete the authentication process. The authentication process can be executed periodically based on predefined timing conditions. In one example, the predefined timing conditions include a specified effective period for each successful authentication. When the specified effective period expires, the authentication process 200 needs to be performed again.

The data storage devices, the computer program and the methods disclosed herein are advantageous in that compared to the conventional single-time authentication approaches, an enhanced automatic, continuous and/or periodical security authentication mechanism for DSDs is provided. Specifically, the disclosed security authentication mechanism provides continuous and/or periodical authentication thereby continuously preventing data theft throughout the entire lifespan of the DSD. In this way, any external hacking of a previously trusted host computer system can be detected and unauthenticated in a timely manner by using the continuous and/or periodical authentication approach.

The authentication approach, which involves traversing each block of the plurality of blocks of the non-volatile memory of the DSD, is characterized by low computational complexity and ease of implementation, thereby enabling effective detection of unauthorized hosts. For example, implementing the method generally requires basic functionalities of the DSD, such as reading (a page in) each block, which includes sending data from and receiving data by the DSD. Typically, the disclosed authentication approach can be completed in less than a few milliseconds.

Furthermore, it is challenging for a malicious third party to repeat the disclosed authentication process as the configuration of a DSD, including channels, dies, planes and blocks of a DSD, varies from device to device and is typically unknown to third parties.

Data Storage Device (DSD)

FIG. 1a shows an embodiment of the DSD 100 comprising a data path 104 and an access controller 110 (also referred to as the controller). The access controller 110 may be comprised of one or more processors. A processor may comprise one or more microprocessors, microcontrollers or controlling circuitry. The one or more processors of the access controller 110 are, in combination or individually, configured to execute program code stored within the system memory 114 to issue commands for controlling the operation of the DSD 100.

The data path 104 comprises a data port 106 configured to transmit data between a host computer system 130 and the DSD 100 (e.g., via a data flow 131). The DSD 100 is configured to register with the host computer system 130 such as to provide functionality to the host computer system 130 of a block data storage device. In some embodiments, the data port 106 includes control operations to translate interface protocols, and to provide other general device functionality.

The DSD 100 is connected to a host computer system 130, which may be a desktop or laptop computer, a tablet computer, a mobile phone, a server (e.g., for a data center), or any other smart device or system that can execute a plurality of computer programs 128. Based on the application scenario, a DSD 100 may either be the primary or secondary DSD of the host computer system 130.

The DSDs 100 may be configured to connect to conventional full-scale computing devices, such as computer workstations and servers, by the use of adapters or similar components. Alternatively, the DSDs 100 may be attached to computing devices in a fixed or non-removable way (e.g., as soldered onto one or more pinouts of a printed circuit board (PCB) or other internal part of the computing system).

The computer program 120 may be installed on and/or executed by the host computer system 130. The computer program 120 may be executed on one or more software operating systems (e.g., Windows, Linux, macOS, DOS, Unix, IOS and Android) implemented on the host computer 130 depending on the characteristics of the host computer 130 and the needs of user 101.

In some embodiments, the computer program 120 is a vendor application that is installed from a vendor platform of the DSD supplier and is only available to registered users with a node-locked license to the DSD 100. For example, the user may use a unique hardware identification (e.g., MAC address of the host computer system 130) to node-lock with a DSD 100. In some embodiments, the computer program 120 will cease to function in response to a license/node address mismatch.

In some embodiments, the DSD 100 is configured to provide functionality to the host computer system 130 of a block data storage device. The DSD 100 comprises a storage medium 108 to store user content data 109. The user content data 109 includes one or more blocks of data organized into files. For example, the user content data 109 includes images, documents, videos, etc., according to a particular file system operable by the host computer system 130.

In some embodiments, the DSD 100 is a solid state disk (SSD) device using NAND (NOT AND) flash technology. A NAND SSD chip typically includes one or more dies (e.g., 1, 2, 4 or 8) connecting to one or more channels that transmit data between the NAND flash controller and NAND flash memories. Each die may include one or more planes. In each plane, multiple NAND blocks are grouped together. Each NAND block may include multiple pages comprising multiple cells, as the smallest pieces of NAND components, to store user content data 109. In some embodiments, multiple NAND blocks across planes (e.g., one NAND block from a plane) are grouped logically together to form a logical block (e.g., a block of the plurality of blocks 128).

The plurality of blocks used for the method 200 may include either all physical blocks of the DSD 100 or a subset of the physical blocks of the DSD 100. Both the complexity and security of the method 200 increase with a larger number of blocks used in the iterative process. A suitable number of blocks may be chosen based on the practical application scenarios of the DSD 100 and the specific needs in these application scenarios.

The DSD 100 includes a cryptography engine 107 configured to receive, interpret and execute commands received from host computer system 130 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI), NVMe, I2C, TLS (Transport Layer Security) Specification for Storage Systems, and other proprietary architectures.

The commands received from the host computer system 130 may include data access request 132 to the storage medium 108 of the DSD 100. The data access requests include requests to read, write, modify and delete one or more blocks of data. In some embodiments, the cryptography engine 107 is connected between the data port 106 and the storage medium 108 and is configured to use one or more cryptographic keys to encrypt user content data 109 to be stored in the storage medium 108, and to decrypt the encrypted user content data 109 stored in the storage medium 108 in response to a request from the host computer system 130.

The storage medium 108 is non-transitory such as to retain the stored block data irrespective of whether the medium 108 is powered. The medium 108 may be a hard disk drive (HDD) with a rotating magnetic disk or a solid state drive (SSD) and its variations like Serial ATA (SATA), mini SATA (mSATA), M.2 and NVMe, combinations of the above such as SSHD, or any other non-volatile storage media. Further, the storage medium 108 may be a block data storage medium, which means that the user content data 109 is written in blocks to the storage medium 108 and read in blocks from the storage medium 108.

In some examples, the DSD 100 includes one or more input components 102 configured to accept input from the user 101. The input components 102 may include a keypad 105, or a similar arrangement of mechanical components that collectively enable the selection of digits or characters for the purpose of forming one or more input credentials and entering the one or more credentials into the DSD 100 for one or more authentication processes. The input components 102 may also include one or more communications devices, such as a wireless modem, configured to receive and transmit data wirelessly via the transmission of electronic messages in a predetermined form. For example, this enables the DSD 100 to receive input data, such as read requests to the DSD 100 from an external device of a user 101.

The access controller 110 controls access of the user 101 to the user content data 109 based on the assessment of data access requests. FIG. 1b illustrates an exemplary embodiment of the access controller 110, which includes: a processor 111; a clock 112 in communication with the processor 111; memory modules in the form of a system memory 114 and data buffer 115 configured to exchange data with the processor 111 and to store the data from the host computer system 130 temporarily; and a power source 113 in the form of an internal battery configured to power to supply power exclusively to components of the access controller 110. Data flows 117 and 119 exist between the processor 111 and the input components 102, and the processor 111 and the data path 104, respectively. The processor 111 is configured to execute program code stored within the system memory 114 to issue commands for controlling the operation of the DSD 100.

The system memory 114 further includes a host authentication application (HAA) 400 for authenticating the host computer system 130 to access the DSD 100. The HAA 400 may be a microprogram executed by the access controller 110 to detect and process the access activities performed by a connected host computer system 130 based on the control commands and/or data passed through the data path 104 by the processor 111. Execution of the HAA 400 thereby enables the DSD 100 to assess data access requests 132 by the host computer system 130 in real-time and to subsequently authenticate or reject the data access requests 132 based on whether the host computer system 130 is authenticated.

Iterative Process for Authenticating a Host Computer System

As described earlier, at step 202, the data storage device (DSD) 100 receives an initial read request to read a block 129 of the plurality of blocks 128 of the non-volatile storage medium 108 from a computer program 120 on the host computer system 130. In response to the initial read request, the DSD 100 sends 204 information from the block 129 to the host computer system 130.

Figure 4:
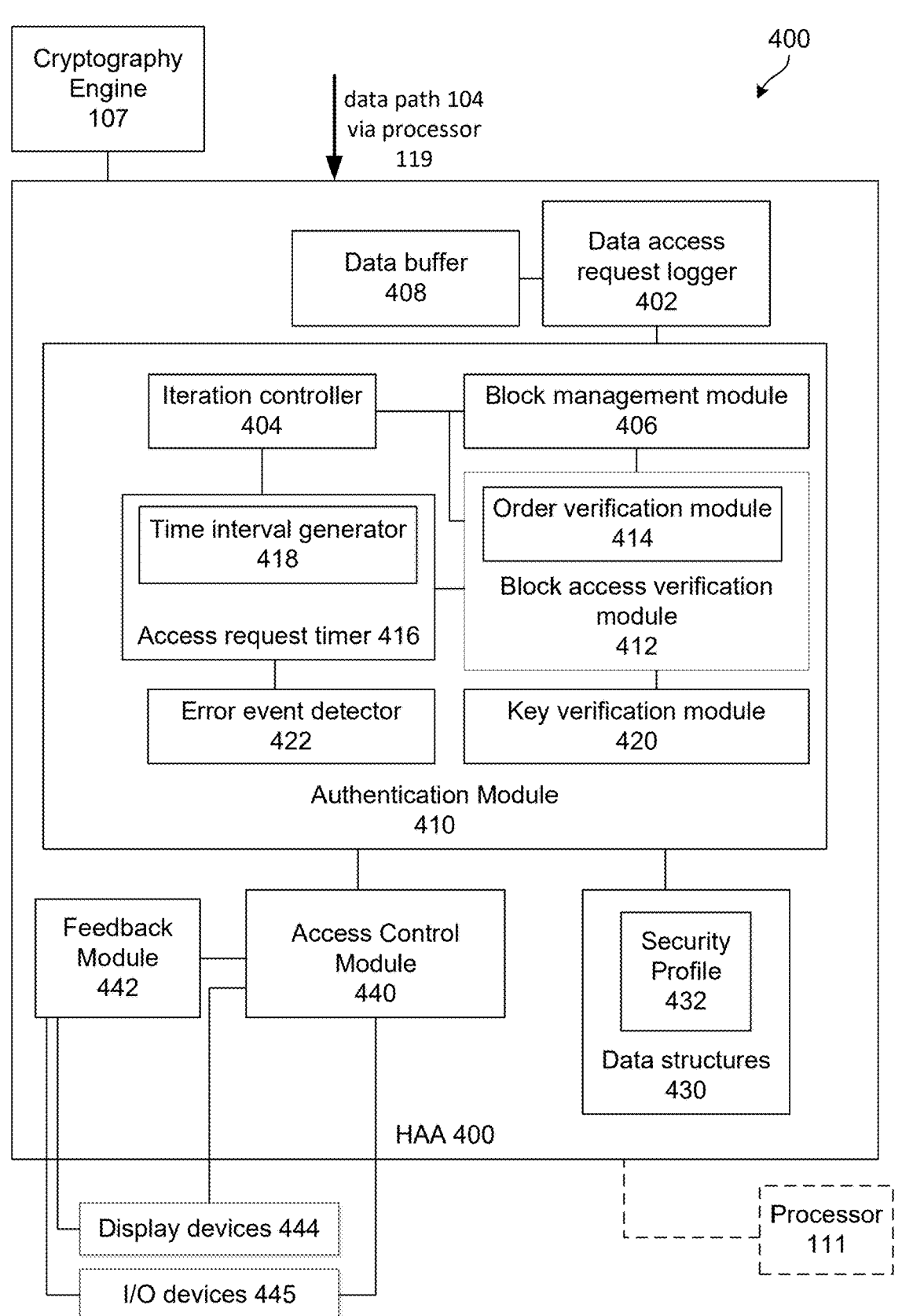
FIG. 4 is a block diagram of an exemplary configuration of a host authorization application (HAA) according to one embodiment.

Referring to FIG. 4 illustrating an exemplary configuration of a host authorization application (HAA), an authentication module 410 may receive and/or process the initial read request from the connected host computer device 130 to read the block 129 by processing the data stream 119 passed through the data path 104. Data access request logger 402 is adapted to process data stream 119 to generate data associated with the access requests receivable by the HAA 400. The initial read request may be temporarily stored in the data buffer 408.

In the described embodiments, the block management module 406 of the authentication module 410 stores data indexing structure of the plurality of blocks 128. Upon receiving the initial read request to read the block 129, the block management module 406 may direct to the block 129 of the volatile storage medium 108 based on the initial read request. For example, this may be based on the particular die, plane to which the block 129 belongs. The block access verification module 412 may then send information stored on the block 129 to the host computer system 130 via data path 104.

Upon receiving the information from the block 129, the computer program 120 on the host computer system 130 may generate a subsequent read request to read a subsequent block (e.g., a second block which is different from the block 129 in the initial request) of the plurality of blocks 128. The DSD 100 then receives 206 the subsequent read request (e.g., a second read request) from the from the computer program 120 based on the information from the block 129.

In the described embodiments, upon receiving the subsequent read request (e.g., the second read request) to read the subsequent block (e.g., the second block), the subsequent read request (e.g., the second read request) may be temporarily stored in the data buffer 408 in addition to the initial read request. The block management module 406 of the authentication module 410 may direct to the subsequent block (e.g., the second block) of the volatile storage medium 108 based on the subsequent read request (e.g., the second read request). In a manner similar to the initial read request, the block access verification module 412 may then send information stored on subsequent block (e.g., the second block) to the host computer system 130 via data path 104.

Upon receiving the information from the subsequent block (e.g., the second block), the computer program 120 may generate a subsequent read request to read a subsequent block (e.g., a third block which is different from the blocks in the initial and second requests) of the plurality of blocks 128 based on the information sent from the block of a previous response (e.g., the second block of the second response). The DSD 100 then receives 206 the subsequent read request (e.g., a third read request) from the host computer system 130.

In response to the DSD 100 receiving 206 the subsequent read request (e.g., the third read request) from the computer program 120, the DSD 100 sends 207 information from the subsequent block (e.g., the third block) to the host computer system 130.

In the described embodiments, the data access request logger 402, block management module 406 and order verification module 414 of the authentication module 410 perform a similar process to that of the initial response to perform steps 202 and 204.

The DSD 100 and the computer program 120 continue to execute a similar iterative process. For example, in a kth iteration, the DSD 100 may iteratively receive, from the computer program 120, a kth read request to read a kth block of the plurality of blocks 128 based on the information sent from the (k−1)th block of the previous response (i.e., the (k−1)th response in the (k−1)th iteration). The kth block may be different from the first to (k−1)th blocks. The kth read request may be temporarily stored in the data buffer 408 in addition to the initial read request, the second to the (k−1)th requests.

In each iteration, the DSD 100 either sends 207 information from the subsequent block to the host computer system 130, or terminates the iterative process in response to determining that each block of the plurality of blocks 128 has been read.

Specifically, in response to the DSD 100 determining that each block of the plurality of blocks 128 has not been read, the DSD 100 continues the iterative process. For example, in response to the DSD 100 determining that each block of the plurality of blocks 128 has not been read, in the (k+1)th iteration, the DSD 100 sends the information from the kth block to the host computer system 130. In response to the DSD 100 determining that each block of the plurality of blocks 128 has been read, the DSD 100 terminates 210 the iterative process, where the total iteration number K equals to k.

In some embodiments, referring to FIG. 4, the iteration controller 404 performs the above process of determining whether to terminate the iterative process. In response to the iteration controller 404 determining that each block of the plurality of blocks 128 has been read, the iteration controller 404 communicates to the block management module 406, preventing the block management module 406 from sending the information on the kth block back to the host computer system 130.

At step 212, in response to the DSD 100 determining 208 one or more conditions are met, wherein the one or more conditions include determining that each block of the plurality of blocks has been read, the DSD 100 determining 212 the host computer system 130 is authenticated to access the DSD 100.

In some embodiments, the iteration controller 404 communicates to the authentication module 410 that the iterative process has terminated. The authentication module 410 may then determine that the host computer system 130 is authenticated to access the DSD 100. As a result, the DSD 100 allows the data access requests (e.g., read, write, modify and/or delete data stored in the storage medium 108) by the host computer system 130.

In some embodiments, determining that each block of the plurality of blocks 128 has been read comprises determining the subsequent block to be read is the block 129 of the initial read request. The authentication module 410 may compare the subsequent block with the block 129, to which the initial read request directs, and determine whether the subsequent block is the same as the block 129. For example, the authentication module 410 may compare the physical address of the subsequent block and that of the block 129 and determine whether the physical addresses are the same.

In some embodiments, determining that each block of the plurality of blocks 128 has been read comprises (i) determining the number of blocks that has been read reaches the total number of the plurality of blocks 128; and/or (ii) the block that has been read is a predefined last block to be read. For example, upon determining that the number of blocks that has been read k equals the total number of blocks K specified in the block management module 406, i.e., k=K, the block access verification module 412 may determine whether the block that has been read by the host computer system 130 is the same as the predefined last block for the iterative process. In one example, the block access verification module 412 may compare the physical addresses of the blocks to make this determination.

In some embodiments, upon the block access verification module 412 determining the subsequent block to be read is the block 129 of the initial read request, the iteration controller 404 terminates the iterative process and clears the read requests that have been stored in the data buffer 408 during the iterative process. In other embodiments, when the iteration controller 404 terminates the iterative process, the previously stored read requests are not cleared but instead packaged to a particular file (e.g., a first file) on the data buffer 408. In the event that a new iterative process starts, the new data requests will be saved to a new file on the data buffer (e.g., a second file) that is different from the particular file (e.g., a first file). These methods prevent the data requests that were previously stored on the data buffer 408 during the previous authentication processes from misleading the determination of whether the subsequent block is the same as the initial block 129 in a current authentication process.

In some embodiments, determining that each block of the plurality of blocks 128 has been read comprises determining that a read request for each block of the plurality of blocks has been received. This may include comparing the blocks specified by the received read requests stored in the data buffer 408 with the ones in block management module 406. To determine whether each block of the plurality of blocks 128 has been read, the authentication module 410 may then determine whether each block identified by the block management module 406 has a match in the blocks specified by the received read requests.

In some embodiments, in addition to determining whether each block of the plurality of blocks 128 has been read, the one or more conditions further include determining that every block of the plurality of blocks 129 has been read once. In some cases, in response to the block access verification module 412 detects repetitive read request to a block (e.g., a ith block) that is not an initial block 129, the access verification module 412 may stop sending the information from the block (e.g., the ith block) to the host computer system 130 and communicate the irregular read pattern to the iteration controller 404. The iteration controller 404 may terminate the iterative process, and the authentication module 410 may determine that the host computer system 130 is unauthenticated to access the DSD 100. The authentication module 410 may further inform an access control module 440 for the determination result.

The above method prevents a malicious third party from attempting to implement methods like brute-force search to find the correct next block to read and perform the iterative authentication process in an undesirable way. The approach further reduces redundant read requests in the iterative process and improves the efficiency of completing the read loop for the plurality of blocks.

In some embodiments, the one or more conditions further include determining that each block of the plurality of blocks 128 has been read in a predetermined order. The predetermined order can be predetermined and stored on the block access verification module 412. The order verification module 414 may record the read order of the plurality of blocks 128 in the iterative process and determine whether the actual read order is the same as the predetermined order. In the cases where the blocks are not read in the predetermined order, the order verification module 414 may notify the iteration controller 404 about the inconsistency in read order. The iteration controller 404 may terminate the iterative process in response to the plurality of blocks 128 has not been read in the predetermined order.

Figure 5:
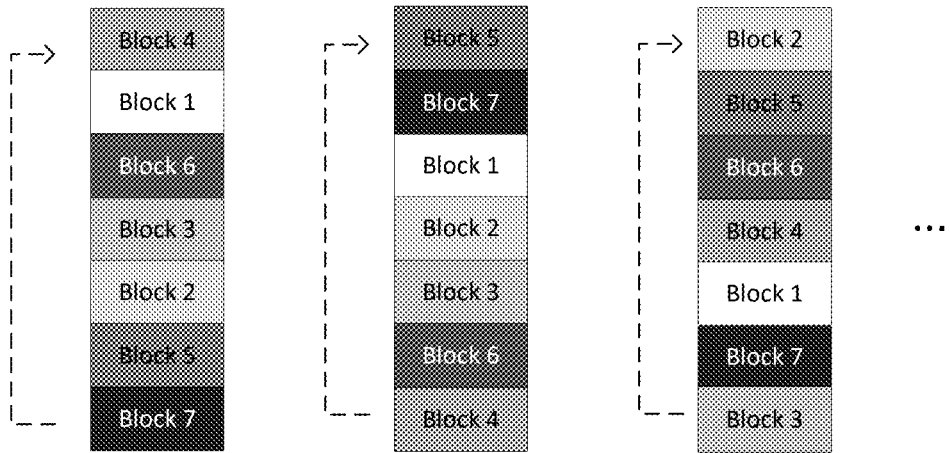
FIG. 5 illustrates an example of a plurality of permutations for an order for traversing the plurality of blocks according to one embodiment.

The predetermined order can be one of a plurality of permutations, each permutation indicating an order for traversing the plurality of blocks 128. FIG. 5 illustrate a plurality of permutations for an order for traversing the plurality of blocks. The number of blocks (e.g., 7 in FIG. 5) is only for illustrative purposes and should not limit the actual number of blocks for a DSD, which is typically much larger than that in the illustrated example in FIG. 5 (e.g., a typical plane of a NAND device can have 2048 blocks and a DSD may contain multiple planes).

Referring to the example FIG. 5 where 7 blocks are to be traversed, according to the first permutation (i.e., Permutation 1), the plurality of blocks 128 are read in a predetermined order Block 4-Block 1-Block 6-Block 3-Block 2-Block 5-Block 7. Similarly, the plurality of blocks 128 can also be read in a predetermined order according to a second permutation (i.e., Permutation 2), i.e., Block 5-Block 7-Block 1-Block 2-Block 3-Block 6-Block 4, or a third permutation (i.e., Permutation 3), i.e., Block 2-Block 5-Block 6-Block 4-Block 1-Block 7-Block 3. The other possible permutations for the predetermined order have been omitted in FIG. 5. For M blocks, the total number of possible predetermined orders is M!=M*(M−1)*(M−2)* . . . *2*1.

The above approaches effectively prevent a malicious host computer system from deceiving the DSD 100 by imitating a legitimate iterative authentication process. Typically, the configuration of the storage medium 108 of a DSD 100, e.g., the configuration of the plurality of blocks 128, is unknown to any third party. Moreover, the number of available blocks is typically large, resulting in a vast number of possible permutations. Therefore, it is highly improbable for a malicious third party to determine the correct predetermined order to traverse the plurality of blocks 128.

Further, the predetermined order may be updated over time, either automatically by the DSD or manually (e.g., by a vendor of DSDs), to enhance the security against potential information leaks in relation to the predetermined order. The predetermined order may vary from device to device, ensuring that the predetermined order cannot be exposed through reverse engineering of a single DSD 100.

Figure 2B:
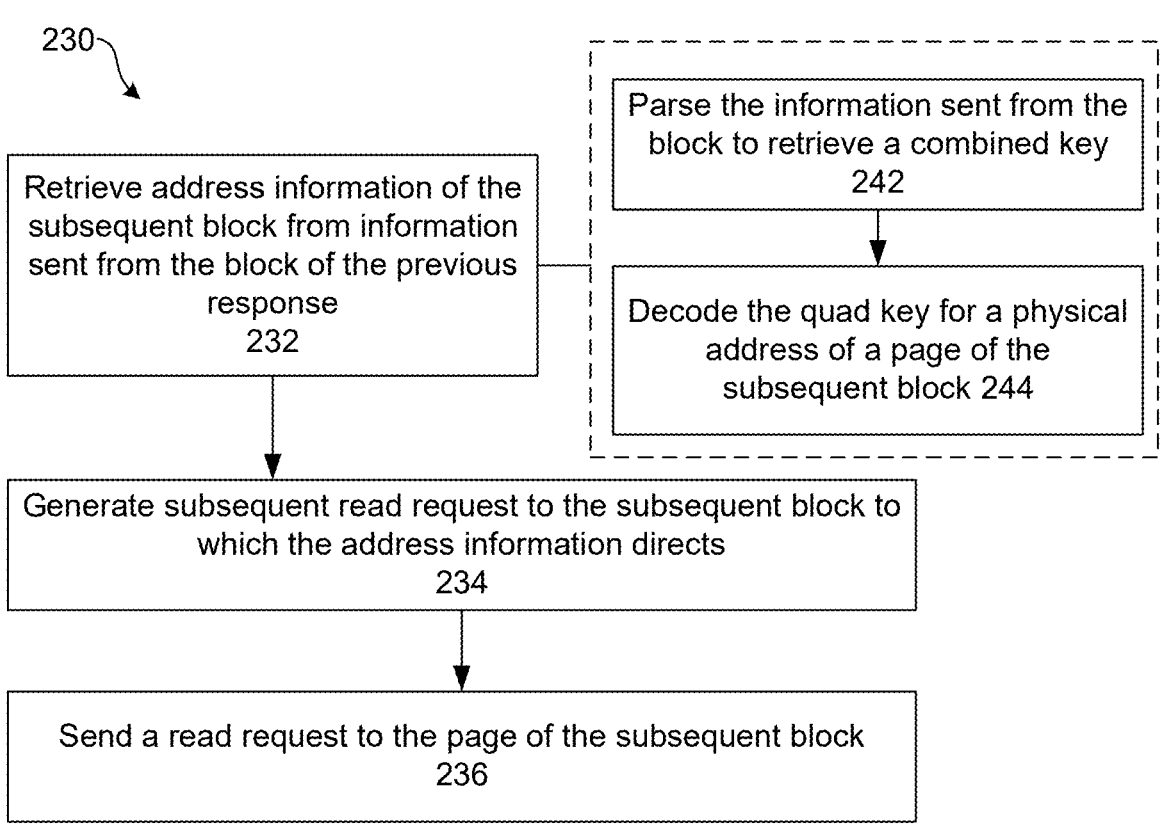
FIG. 2b is a flow diagram of a process by the computer program to generate and send a subsequent read request for the next iteration according to one embodiment.

Referring to FIG. 2b, in some embodiments, in each iteration, upon receiving information from the block of the previous response, the host computer system 130 generates 230, through the computer program 120, a subsequent read request based on the information. The generation 230 of the subsequent read request comprises retrieving 232 address information of the subsequent block from the information sent from the block of the previous response. The computer program 120 may be specifically designed to retrieve the address information for the next iteration. In some embodiments, the information sent from each block is encrypted by the DSD and the computer program 120 needs to decrypt the information before retrieving the address information.

Retrieving 232 the address information of the subsequent block from the information sent from the block of the previous response may comprise parsing 242 the information sent from the block to retrieve a combined key 242 and decoding 244 the combined key for a physical address of a subsequent page of the subsequent block. In some embodiments, the combined key 242 is associated with combination information on a channel, a die, a plane and a block of the non-volatile storage medium 108 of the DSD 100. For example, the combined key 242 may be a quad key including information regarding channel/die/plane/block (CH/DIE/PL/BLK) details specifying the physical address of the subsequent block. The computer program 120 may parse the first and last set of bytes of the information sent from the block of the previous response to retrieve the quad key. The computer program 120 may then decode the parsed bytes to obtain the physical address of a subsequent page of the subsequent block for the next iteration. The combined key 242 can also be in other forms such as a hexadecimal string, an encrypted hash, or a binary sequence including the information of the physical address.

Based on the address information retrieved through the above methods, the generation 230 of the subsequent read request further comprises generating 234, by the computer program 120 the subsequent read request to the subsequent block to which the address information directs. The retrieved address information may be included in the subsequent read request. The generation 230 of the subsequent read request may further comprise sending 236 a read request to the subsequent page of the subsequent block.

The computer program 120 is specifically configured to perform the above process of generating 230 the subsequent read request in each iteration. For example, the computer program 120 may be configured to execute specific parsing and decoding algorithms in relation to the combined key to retrieve the address information of the subsequent block. Those configurations of the computer program 120 are typically not publicly available, and can further enhance the security of the authentication method.

Figure 2C:
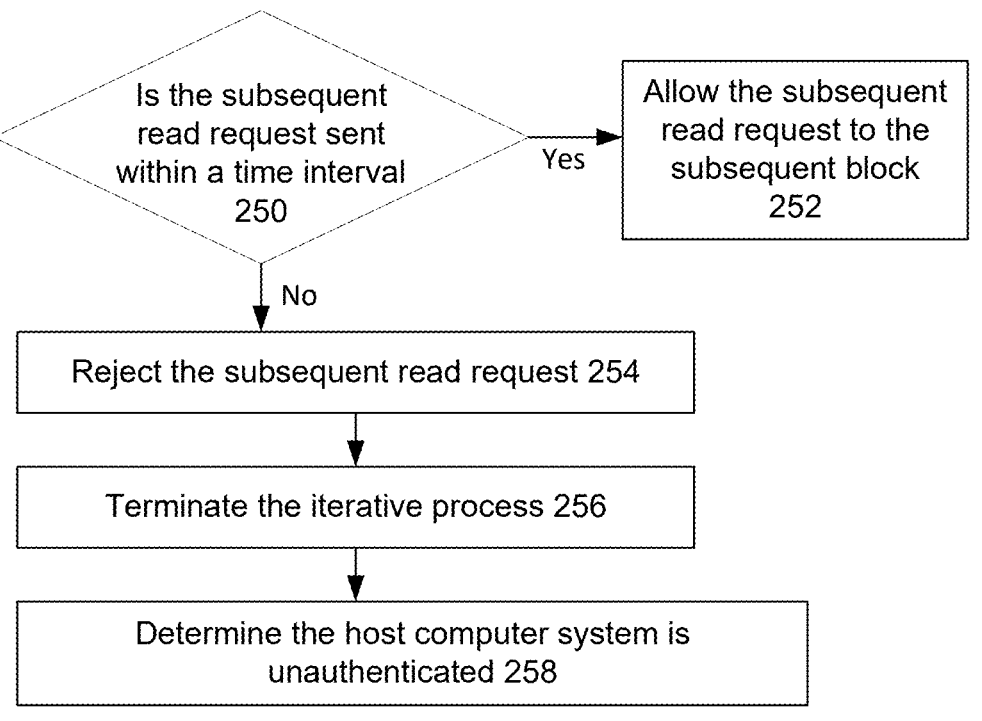
FIG. 2c is a flow diagram of a process for determining whether to allow a subsequent read request based on a time interval according to one embodiment.

Referring to FIG. 2c, in some embodiments, the iterative process further comprises determining 250 whether the subsequent read request was sent within a time interval, which typically happens between steps 206 and 207 as shown in FIG. 2a. In response to determining 252 that the subsequent reading request was sent within the time interval, the DSD 100 allows the subsequent read request to the subsequent block, and accordingly, the iterative process continues. In response to determining that the subsequent read request was not sent within the time interval, the DSD 100 may perform any one or more of the following steps: (i) rejecting 254 the subsequent read request; (ii) terminating 256 the iterative process; and/or (iii) determining 258 the host computer system is unauthenticated.

In some embodiments, the method 200 further comprises generating an arbitrary timestamped identifier configured to define the time interval. Specifically, the length of the time interval is arbitrary as defined by the arbitrary timestamped identifier. In general, it is challenging for a third party to predict the arbitrary length of the time interval.

In some examples, the DSD 100 starts to count the time when an authentication process begins. The DSD 100 determines whether the subsequent read request was sent within the time interval, where duration is calculated from the beginning time of the authentication process to the sending time of the subsequent read request, and compared with the time interval. In one example, a timestamp of the subsequent read request indicating the sending time of the subsequent read request is checked by the DSD 100.

For example, in one authentication process beginning at 11:00:00 am, the arbitrary timestamped identifier may specify that the length of time interval is 11 seconds. In this case, any subsequent read request should be sent within 11 seconds, i.e., before 11:00:11 am. In a later authentication process beginning at 3:23:10 μm, the arbitrary timestamped identifier may specify that the length of time interval is 9 seconds. In this case, the acceptable time for the DSD 100 to receive the subsequent read request is before 3:23:19 pm.

In some embodiments, the access request timer 416 determines whether the subsequent read request was sent within the time interval generated by the time interval generator 418. The access request timer 416 may generate the arbitrary timestamped identifier based on the generated time interval. To perform the determination step 250, the access request timer 416 may calculate the duration from the beginning of the authentication process to the time when the subsequent read request is sent and compare the duration with the time interval. In response to determining that the subsequent read request was not sent within the time interval, the access request timer 416 may communicate this information to the iteration controller 404 and the block access verification module 412. In response, the block access verification module 412 may reject 254 the subsequent read request, the iteration controller 404 may terminate 256 the iterative process, and the authentication module may determine that 258 the host computer system is unauthenticated. The authentication module 410 may further inform an access control module 440 of the determination result that the host computer system 130 is unauthenticated.

The above approach improves security in the scenario where an attacker attaches a bus analyzer between the host computer system 130 and the DSD 100, and the bus analyzer records the sequence of commands from a legitimate authentication process to attempt replaying the recorded sequence of commands to succeed in authentication. By utilizing the arbitrary timestamped identifier to define the time interval, the method ensures that replayed commands are highly likely to fall outside the acceptable time window with an arbitrary length, and that the timestamps are unlikely to match the ones in the legitimate authentication process.

Figure 3B:
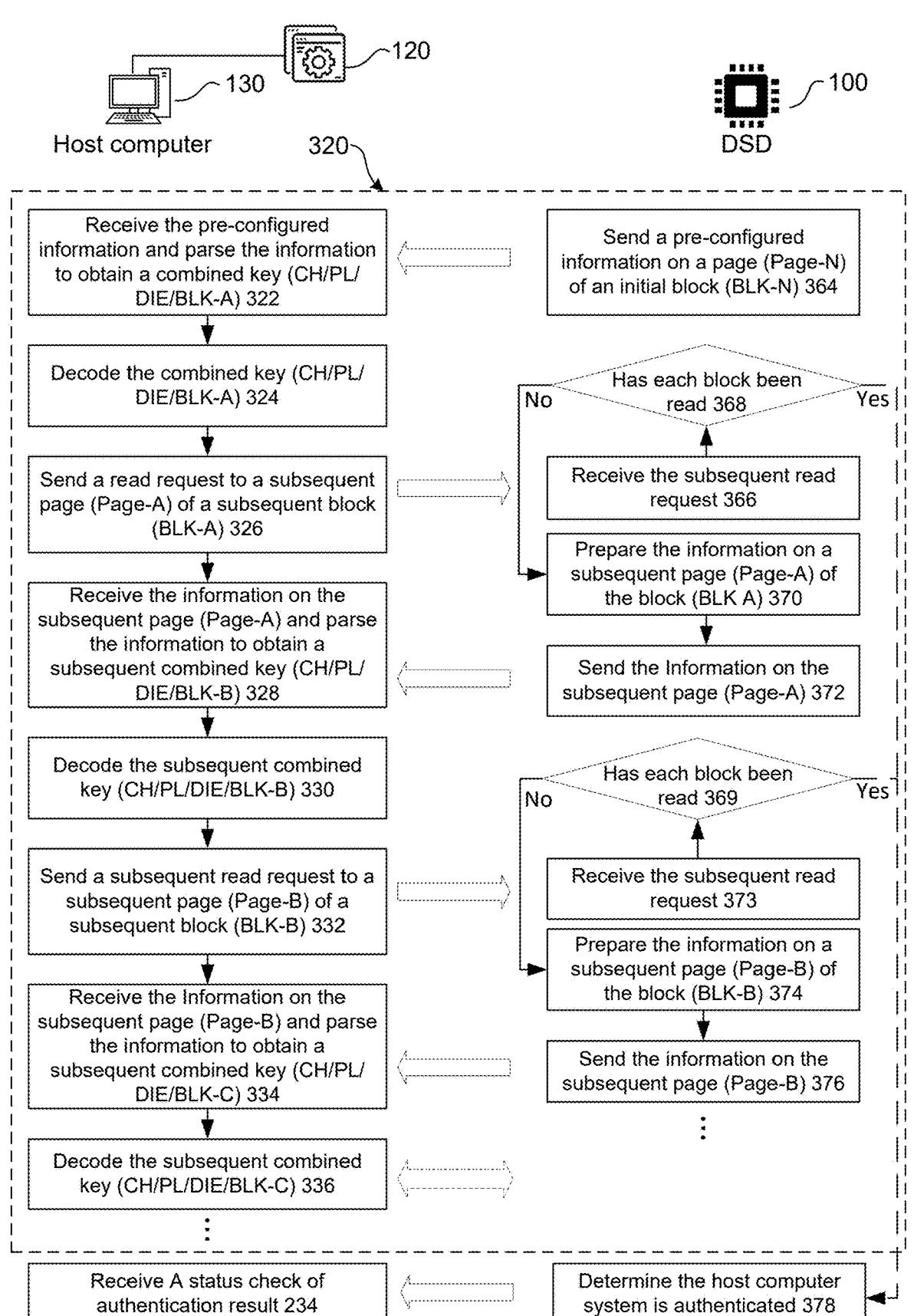
FIG. 3b is a flow diagram of an iterative process during the authentication of the host computer system to access the DSD from the perspective of both the host computer system and the DSD according to one embodiment.

FIG. 3*b* shows an exemplified iterative process 320 during the authentication of the host computer system to access the data storage device (DSD) 100 from the perspective of both the host computer system 130 and the DSD 100. In the example, the DSD 100 has received, from the computer program 120 on the host computer system 130, an initial read request to read an initial block (Block-N). In response, the DSD sends 364 a pre-configured information from Page-N of the Block-N to the host computer system 130.

The host computer system 130 then receives 322 the pre-configured information. The computer program 120 parses the pre-configured information to obtain a combined key (CH/PL/DIE/BLK-A) and decodes 324 the combined key (CH/PL/DIE/BLK-A) to obtain the physical address of a subsequent page (Page-A) of a subsequent block (Block-A). Based on the obtained physical address, the host computer system 130 then sends 326 a read request to the subsequent page (Page-A) of the subsequent block (Block-A).

Upon receiving 366 the read request to the subsequent page (Page-A) of the subsequent block (Block-A), the DSD 100 determines 368 whether each block of the plurality of blocks 128 has been read. In response to each block of the plurality of blocks 128 has been read, the DSD 100 would determine that the host computer system 130 is authenticated. In this example, the DSD 100 determines that the plurality of blocks 128 has not been read, and in response, the DSD 100 prepares 370 the information on the subsequent page (Page-A) of the block (Block-A).

In a new iteration (i.e., the second iteration), the DSD 100 sends 372 the information on the subsequent page (Page-A) of the block (Block-A) to the host computer system 130. Accordingly, the host computer system 130 receives 328 the information stored on the subsequent page (Page-A) of the subsequent block (Block-A) (i.e., the block of the previous response).

Similar to the previous response (i.e., the first iteration), the computer program 120 parses the information on the subsequent page (Page-A) to obtain a combined key (CH/PL/DIE/BLK-B) and decodes 330 the combined key (CH/PL/DIE/BLK-B) to obtain the physical address of a subsequent page (Page-B) of a subsequent block (Block-B). Based on the obtained physical address, the host computer system 130 then sends 332 a read request to the subsequent page (Page-B) of the subsequent block (Block-B).

Upon receiving 373 the subsequent read request to the subsequent page (Page-B) of the subsequent block (Block-B), the DSD 100 determines 369 whether each block of the plurality of blocks 128 has been read. In response to each block of the plurality of blocks 128 has been read, the DSD 100 would determine that the host computer system 130 is authenticated. In this example, the DSD 100 determines that the plurality of blocks 128 has not been read, and in response, the DSD 100 prepares 374 the information on the subsequent page (Page-B) of the block (Block-B).

In a new iteration (i.e., the third iteration), the DSD 100 then sends 376 the information on the subsequent page (Page-B) of the block (Block-B) to the host computer system 130. Accordingly, the host computer system 130 receives 334 the information stored on the subsequent page (Page-B) of the subsequent block (Block-B) (i.e., the block of the previous response).

Similar to the previous response (i.e., the second iteration), the computer program 120 parses the information on the subsequent page (Page-B) to obtain a combined key (CH/PL/DIE/BLK-C) and decodes 336 the combined key (CH/PL/DIE/BLK-C) to obtain the physical address of a subsequent page (Page-C) of a subsequent block (Block-C).

Based on the obtained physical address, the host computer system 130 then sends a read request to the subsequent page (Page-C) of the subsequent block (Block-C). Upon receiving the subsequent read request to the subsequent page (Page-C) of the subsequent block (Block-C), the DSD 100 determines 369 whether each block of the plurality of blocks 128 has been read (not shown in FIG. 3*b*). An iterative process similar to the above first and second iterations continues until the DSD 100 determines that each block of the plurality of blocks 128 has been read and accordingly determines 378 that the host computer system is authenticated. The computer program 120 of the host computer system 130 may receive 234 a status check of the authentication result (e.g., pass or fail).

Multi-Level Authentication

In addition to the iterative authentication process, as shown in FIGS. 2a-2c and 3b, the method 200 may further comprise additional authentication processes independent of the iterative authentication process. The different authentication processes form a multi-level authentication that provides additional layers of security against unauthenticated host computer systems attempting to access the data storage device (DSD).

FIG. 2d illustrates an authentication process using keys based on a unique identifier of the DSD 100. In the illustrated example, the authentication process is executed before the iterative process, i.e., before the step 202 (as a first authentication). However, it is to be understood that a similar authentication process can also be implemented after the iterative authentication process, e.g., after step 210, which terminates the iterative process, and before determining 212 that the host computer system is authenticated.

Referring to FIG. 2d, the method 200 may comprise the DSD 100 receiving 261 a request from the host computer system 130 for a unique identifier of the DSD 100. In response, the DSD 100 sends 262 identity information to the host computer system 130. The unique identifier may be a serial number of the DSD 100 in the form of an alphanumeric string including random numerals and/or characters that uniquely identify the DSD 100. Typically, different DSDs have different unique identifiers determined by the vendor of the DSDs, which are unpredictable by third parties.

Figure 2E:
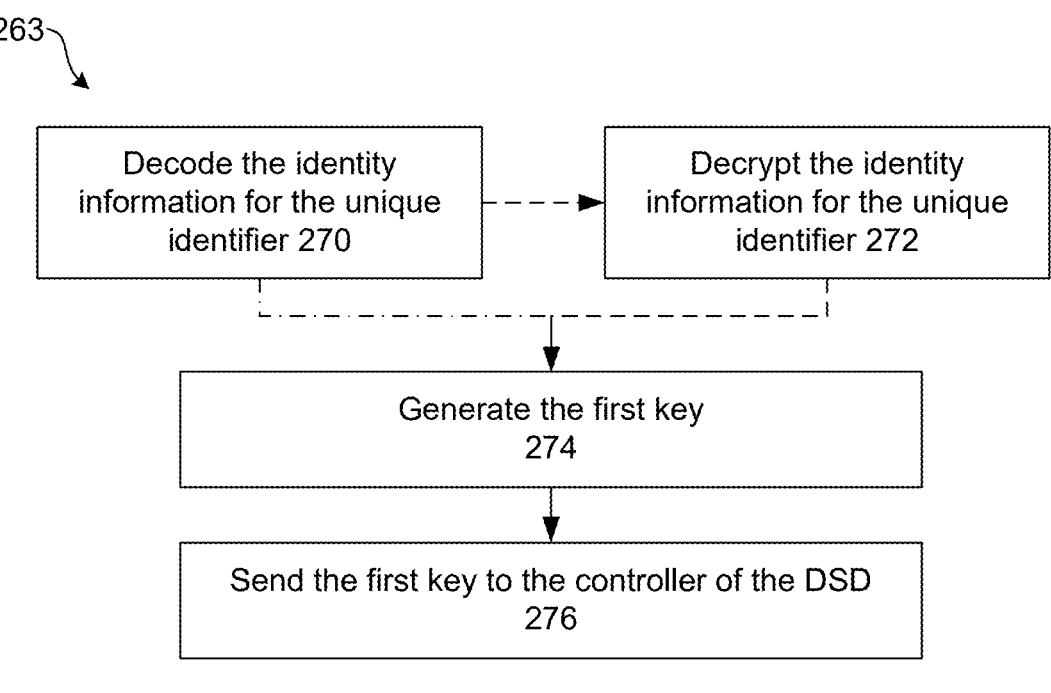
FIG. 2e is a flow diagram of a process for generating and sending a first key for use in the authentication process shown in FIG. 2d based on the unique identifier according to one embodiment.

The method 200 may also comprise generating 263 a first key, by the computer program 120 on the host computer system 130, based on the identity information sent from the DSD 100. Referring to FIG. 2e, the generation 263 of the first key based on the identity information may comprise the computer program 120 decoding 270 and/or decrypting 272 (in the cases where the identity information is encrypted by the DSD 100), the identity information for the unique identifier. The decoding and/or decryption may be based on coding-decoding and/or encryption-decryption algorithms as predefined by the DSD 100 and the computer program 120.

Generating 263 the first key may further comprise the computer program 120 generating 274 the first key based on the decoded and/or decrypted unique identifier and sending 276 the first key to the controller of the DSD 100 for further authentication steps.

The method 200 may also comprise generating 264 a second key, by a controller 110 of the DSD 100, based on the unique identifier stored on the DSD. The unique identifier may be on the security profile 432 of the data structure module 430. The data structure module 430 of the HAA 400 is configured to store, process, organize, maintain and/or update data in various forms such as array, stack, list, table, tree or any other data structure that is suitable to store data in relation to the data access management (e.g., assessment and control).

In some embodiments, generating 263 the first key comprises hashing the decoded and/or decrypted unique identifier, and generating the second key 264 comprises hashing the unique identifier stored on the DSD 100. Typically, hashing the decoded and/or decrypted unique identifier comprises applying one-way hashing algorithms including a secure hash algorithm, message digest algorithm, Whirlpool or hash-based message authentication code. The hash method can be any one of but not limited to the following types: SHA: SHA-1, SHA-2, SHA-3, SHA-256, MD5, RIP-EMD-160, Whirlpool and HMAC. The hashing methods can make the first and second keys less predictable and more resistant to undesirable exposure.

The method 200 may further comprise determining 265, by the controller 110 of the DSD 100, whether the first key matches the second key. This may include determining whether the first key is the same as the second key. In some embodiments, the first key matching the second key includes that the first key is the same as the second key. For example, "5D872cA9" as a first key matches the second key "5D872cA9". In further embodiments, the first key matching the second key includes the first key being sufficiently the same as the second key. For example, "5D872cA9" as a first key may be considered as matching the second key "5D872CA9" or "05D872cA9", respectively.

The method 200 may further comprise in response to determining 265 the first key does not match the second key, the DSD 100 determining 266 the host computer system 100 is unauthenticated; and in response to determining the first key matches the second key, executing the iterative process, the DSD 100 executing the iterative process. For example, the DSD 100 then receives an initial read request to read a block of the plurality of blocks 128 and continues executing the iterative process as described earlier. The above authentication process 260 may be performed by the key verification module 420 of the authentication module 410, which is connected to the data structure module 430.

FIG. 3a shows an exemplified process for authenticating the host computer system to access DSD 100 from the perspective of both the host computer system 130 and the DSD 100. In the example, the authentication process 260 is performed before the iterative process 320. As the authentication process 260 is independent of the iterative process 320, the authentication steps 304 to 358 can also be performed after the iterative process 320.

At step 302, a computer program 120 may be installed on the host computer system 130. The computer program 120 may be a vendor application that is installed from a vendor platform of the DSD supplier and is only available to registered users of the DSD 100. In some embodiments, the computer program 120 is downloaded from the cloud or via a secure physical medium such as a USB drive.

In some embodiments, the computer program 120 verifies the connection between the host computer system 130 and the DSD 100 and enables the vendor of the DSD to collect sanity details of the host computer system 130 and further log the sanity details in the non-volatile memory 108 of the DSD 100.

In the described embodiment, the computer program 120 scans the Peripheral Component Interconnect Express (PICe) periodically to detect 306 any DSD connected to the host computer system 130. In response to the computer program 120 detecting a DSD 100, the computer program 120 sends 308 an identity command to the DSD 100 requesting for the unique identifier of the DSD 100. Upon receiving 352 the identity command, the DSD 100 responds to the identity command by sending 354 identity information to the host computer system 130. The DSD 100 also generates 356 a second key based on a unique identifier stored in the DSD 100 (e.g., assigned and pre-stored by the vendor of the DSD).

With the identity information sent from the DSD 100, the computer program 120 may decode and/or decrypt the identity information and obtain the decoded/decrypted unique identifier 310. The computer program 120 may generate 312 a first key based on the decoded/decrypted unique identifier, and then send the first key to the DSD 100.

The DSD 100 may then determine 358 whether the first key matches the second key. This may include the controller 110 of the DSD 100 comparing the first key with the second key and determining whether the first key is the same as the second key. For example, the key verification module 420 may be configured to perform a digit-wise comparison between the first key and the second key, where the first key is determined to match the second key responsive to each digit being identical over the length of the codes.

In some embodiments, in response to the DSD 100 determining the first key does not match the second key, the DSD 100 terminates 360 the authentication process. The DSD 100 also sends 362 an indication of the authentication failure to the host computer system 130, for example, an error message stating "the security keys do not match." In response to the DSD 100 determining the first key matches the second key, the DSD 100 and the host computer system 130 start the iterative process 320 as described earlier.

Figure 2F:
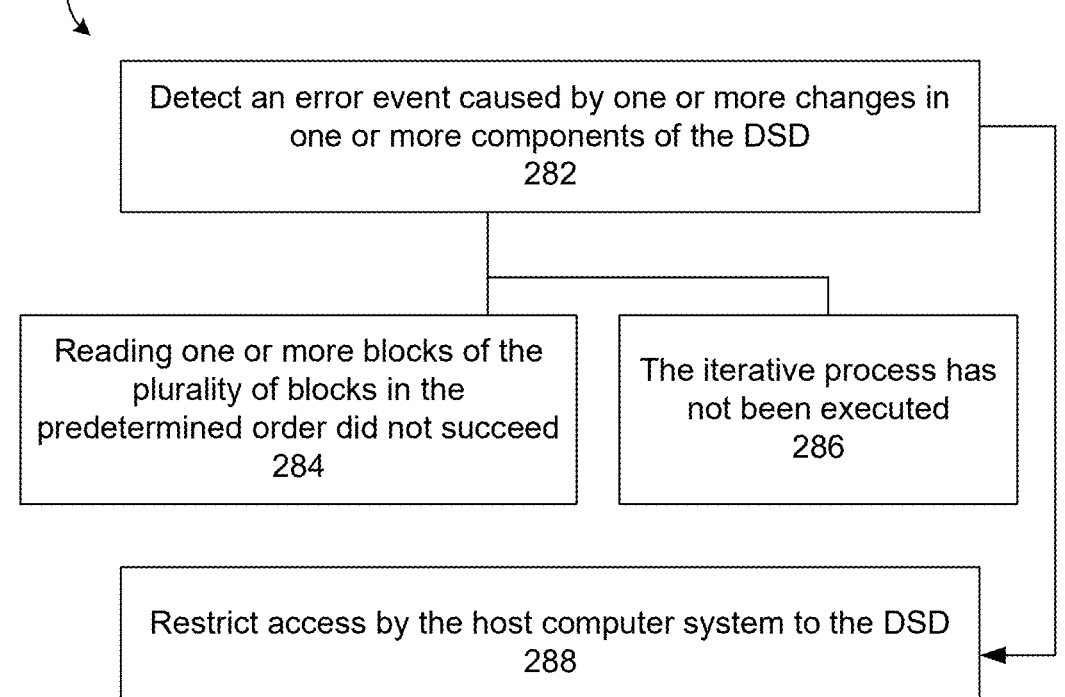
FIG. 2f is a flow diagram of a process for restricting access by the host computer system to the DSD based on detecting an error event according to one embodiment.

FIG. 2*f* illustrates a further device-level authentication process that enhances the security of the DSD 100 against tampering with one or more components of the DSD 100. Referring to FIG. 2*f*, the further authentication comprises detecting 282 an error event caused by one or more changes in one or more components of the DSD 100. For example, the one or more changes in one or more components include changes to ball grid array (BGA) package, changes to the controller, and any other changes of hardware or software changes of the DSD 100.

Such one or more changes in one or more components may cause an error event which may indicate that reading one or more blocks of the plurality of blocks in the predetermined order did not succeed 284. For example, in response to changes to the BGA package of the DSD 100 occur, then the iterative reads to the plurality of blocks 128 may fail, triggering the error event. The error event may also indicate that the iterative process has not been executed 286. For example, in response to changes of the controller 110 are attempted, a timer on the DSD 100 (e.g., a NAND flash) can detect whether the iterative reads have not been executed.

The further authentication also comprises in response to the error event detected, restricting 288 access by the host computer system 130 to the DSD 100. In the described embodiments, the further authentication is performed by an error event detector 422 of the authentication module 410. The error event detector 422 may be connected to the access request timer configured to detect whether the iterative process has been executed or not.

The further authentication may be independent of the host computer system 130 and provides an additional layer of security to detect changes in the hardware and/or software of the DSD 100. The further authentication process may be performed either during and/or after the iterative authentication process. This effectively secures the DSD 100 against a malicious party tampering with the components of the DSD 100 (e.g., replacing one or more hardware components or resetting the controller 110) to alter its security functionalities and/or steal data.

In some embodiments, an access control module 440 connects to the authentication module 410. Based on the determination result of whether a host computer system is authenticated or unauthenticated, the access control module 440 allows or rejects access requests from the host computer system 130. In some examples, the access control module 440 may receive one or more indications of the determination results regarding whether the host computer system 130 is authenticated or not.

In some embodiments, in response to determining the host computer system 130 is authenticated, the authentication module 410 provides further instructions to the processor 111 of the DSD 100 to allow and execute data access requests from the host computer system 130. This may include the processer 111 executing the data access requests temporarily stored in the data buffer 115.

In some embodiments, in response to determining the host computer system 130 is not authenticated, the access control module 440 rejects data access requests from the host computer system 130. This may include the access control module 440 communicating with the processer 111 to stop executing the data access requests from the host computer system 130 and/or deleting the data access requests from the host computer system 130, which were temporarily stored in the data buffer 115.

The access control module 440 may further communicate with other elements of the HAA 400 (e.g., a feedback module 442) to further inform user 101 that the host computer system 130 is not authenticated by the DSD 100. For example, the access control module 440 may input information regarding the host computer system not being authenticated to the feedback module 442, which is in connection with an I/O device interface 445 and/or a display device interface 444. The feedback module 442 may generate data in various types for generating different types of information, such as text, graphics, sound, and light, to be delivered to the user 101.

The I/O device interface 445 provides functionality enabling the user 101 to interact with the DSD 100 via one or more I/O devices 444 such as a mouse and keyboard. Other external user input devices that may be connected include a microphone, an IR remote control, camera, and gesture systems. The I/O device interface 445 also provides functionality for the DSD 100 to instruct output peripherals, which may include printers, audio devices, and imaging devices.

The display device interface 445 may include one or more dedicated graphics interfaces, which transmit graphics and video signals between the DSD 100 and display devices. The display devices 446 may include hardware components that present information in visual form, such as monitors and displays.

The multi-level authentication, including one or more authentication processes, provides host-to-DSD authentication and DSD-level authentication to secure user content data stored on the DSD. The additional authentication processes, such as the authentication processes 260 and 280, can be independently activated or disabled, and the order of executing the activated authentication processes can be adjusted flexibly by the vendor of a DSD based on the practical application scenario of a DSD.

Figure 6:
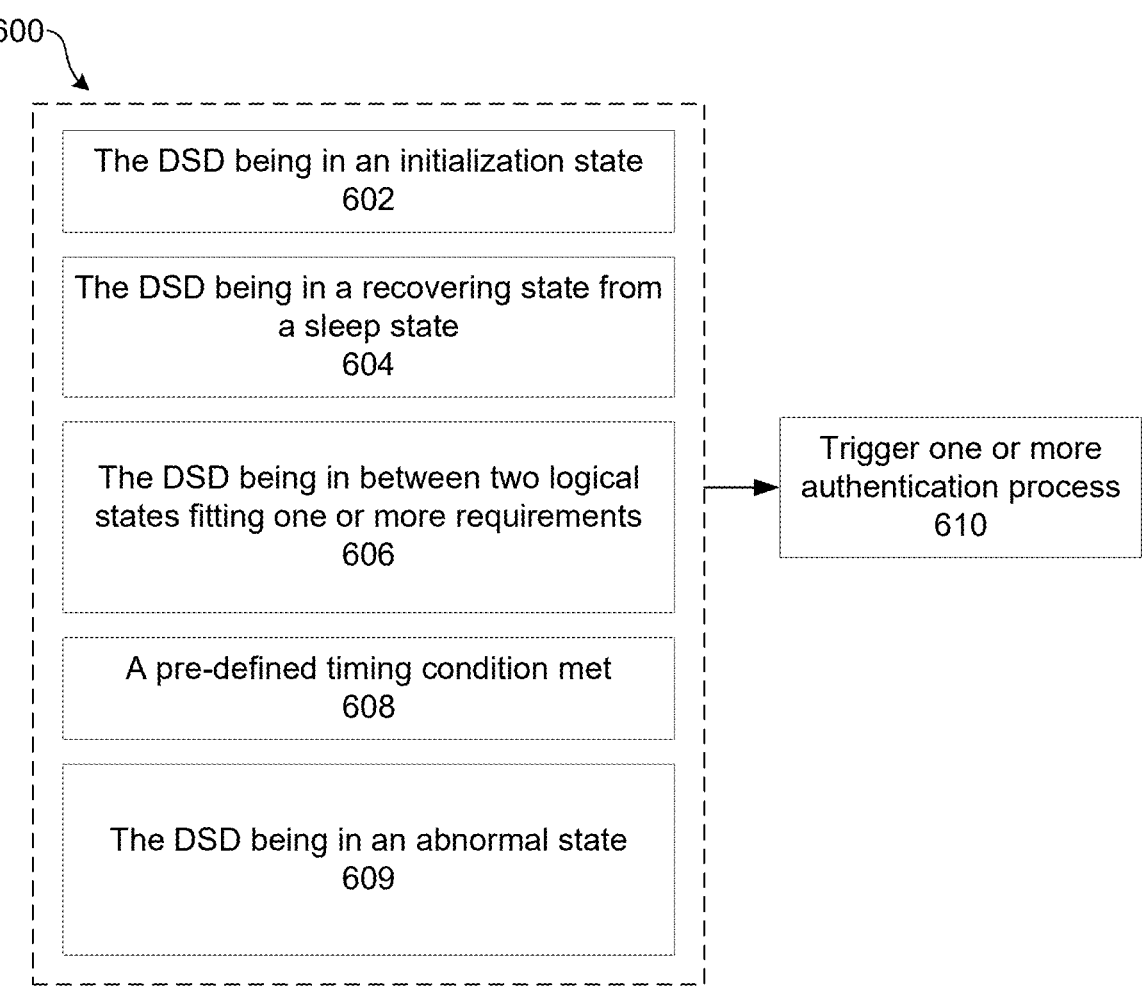
FIG. 6 illustrates an example of the scenarios to trigger the authentication process of the host computer system.

Referring to FIG. 6, the multi-level authentication approach may be triggered 610 in a diverse range of scenarios. For example, the method 200 may be triggered in the following one or more scenarios, including but not limited to: (i) the DSD being in an initialization state 602, such as during the first power-on process when connecting a new DSD to a host computer system; (ii) the DSD being in a recovering state from a sleep state 604 (e.g., a low-power mode); (iii) the DSD being in between two logical states fitting one or more requirements 606, such as transitioning from read mode to write mode; (iv) a predefined timing condition met 608 (e.g., each successful authentication being effective for a specified effective period), which enables continuous security authentication throughout the lifespan of the DSD; and/or (v) the DSD being in an abnormal state, the abnormal state includes a number of data access requests attempted by the host computer system has exceeded a threshold value.

Moreover, the method 200 may further comprise an additional security mechanism including encrypting data transmitted between the host computer system 130 and the DSD 100. The additional security mechanism may also include decrypting the encrypted data by the host computer system 130 and/or the DSD 100. For example, the session data between the host computer system 130 and the DSD 100 may be encrypted/decrypted in a manner similar to VPN (virtual private network), TLS (Transport Layer Security) and HTTPS (Hypertext transfer protocol secure). The additional security mechanism may be implemented by the cryptography engine 107. In some embodiments, the access controller 110 issues commands to the data path components to cause the cryptography engine 107 to encrypt or decrypt the data sent to or received from the host computer system 130. The additional security mechanism can secure the DSD 100 against access and manipulation, such as man-in-the-middle attack.

Throughout this specification the word "iterative" refers to a procedure that involves repetitions of a process in order to generate a (possibly unbounded) sequence of outcomes. Each repetition of the process is defined as an "iteration" or a loop, and the outcome of each iteration is then the starting point of the next iteration.

Throughout this specification the word "comprise"", or variations such as "comprises" or "comprising", will be understood to imply the inclusion of a stated element, integer or step, or group of elements, integers or steps, but not the exclusion of any other element, integer or step, or group of elements, integers or steps.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

Similarly, it is to be noticed that the term connected, when used in the claims, should not be interpreted as being limited to direct connections or couplings only. The term "connected", along with its derivatives, may be used. It should be understood that the scope of the expression a device A "connected to" a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still cooperate or interact with each other.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for authenticating a host computer system to access a data storage device (DSD) comprising a non-volatile storage medium including a plurality of blocks, wherein the method comprises:
   receiving, from the host computer system, an initial read request to read a block of the plurality of blocks;
   sending, responsive to receiving the initial read request, information from the block to the host computer system, thereby causing the host computer system to retrieve, using a combined key based on the information from the block, an address of a subsequent block of the plurality of blocks, wherein the combined key is based on combination information on a channel, a die, a plane, and the subsequent block in the non-volatile storage medium;
   iteratively receiving, from the host computer system, subsequent read requests to read each subsequent block of the plurality of blocks based on information sent from a block of a previous response;
   sending, in each iteration, information from the subsequent block to the host computer system for retrieving an address of a next subsequent block;
   terminating the iterations in response to determining that each block of the plurality of blocks has been read; and
   determining the host computer system is authenticated in response to determining one or more conditions are met, wherein the one or more conditions include determining that each block of the plurality of blocks has been read.

2. The method of claim 1, wherein determining that each block of the plurality of blocks has been read comprises determining the subsequent block to be read is the block of the initial read request.

3. The method of claim 1, wherein the one or more conditions further include determining that every block of the plurality of blocks has been read once.

4. The method of claim 1, wherein the combined key comprises a quad key parsed from at least one set of bytes in the information from the block.

5. The method of claim 1, wherein retrieving the address of the subsequent block comprises:
   parsing the information sent from the block to retrieve the combination information on the channel, the die, the plane and the subsequent block; and
   decoding the combined key for a physical address of a subsequent page of the subsequent block.

6. The method of claim 1, wherein the combined key is selected from:
   a quad key comprising channel/die/plane/block;
   a hexadecimal string;
   an encrypted hash; and
   a binary sequence.

7. The method of claim 1, wherein each iteration further comprises:
   determining whether the subsequent read request was sent within a time interval;
   in response to determining that the subsequent read request was sent within the time interval, allowing the subsequent read request to the subsequent block; and
   in response to determining that the subsequent read request was not sent within the time interval:
   rejecting the subsequent read request;
   terminating the iterations; and/or determining the host computer system is unauthenticated.

8. The method of claim 7, further comprising generating an arbitrary timestamped identifier configured to define the time interval, a length of the time interval being arbitrary as defined by the arbitrary timestamped identifier.

9. The method of claim 1, wherein the one or more conditions further include determining that each block of the plurality of blocks has been read in a predetermined order.

10. The method of claim 9, wherein the predetermined order is one of a plurality of permutations, each permutation indicating an order for traversing the plurality of blocks.

11. The method of claim 9, further comprising performing a further authentication, wherein the further authentication comprises:

detecting an error event caused by one or more changes in one or more components of the DSD,
wherein the error event indicates that:
reading one or more blocks of the plurality of blocks in the predetermined order did not succeed; and/or
each iteration has not been executed; and
in response to the error event is detected, restricting access by the host computer system to the DSD.

12. The method of claim 1, further comprising performing a first authentication before executing the iterative process, the first authentication comprising:

receiving a request from the host computer system for a unique identifier of the DSD and in response sending identity information to the host computer system;
generating a first key, by the host computer system, based on the identity information;
generating a second key, by a controller of the DSD, based on the unique identifier stored on the DSD;
determining, by the controller of the DSD, whether the first key matches the second key;
in response to determining the first key does not match the second key, determining the host computer system is unauthenticated; and
in response to determining the first key matches the second key, executing sending information from the block to the host computer system to initiate the iterations.

13. The method of claim 12, wherein generating, by the host computer system, the first key based on the identity information comprises:

decoding and/or decrypting, by the host computer system, the identity information for the unique identifier;
generating, by the host computer system, the first key based on the decoded and/or decrypted unique identifier; and
sending, by the host computer system, the first key to the controller of the DSD.

14. The method of claim 13, wherein generating the first key comprises hashing the decoded and/or decrypted unique identifier, and/or wherein generating the second key comprises hashing the unique identifier stored on the DSD.

15. The method of claim 1, wherein the method is triggered in one or more scenarios, the one or more scenarios comprising:

the DSD being in an initialization state;
the DSD being in a recovering state from a sleep state;
the DSD being in between two logical states fitting one or more requirements;
a predefined timing condition met; and/or the DSD being in an abnormal state, wherein the abnormal state includes that a number of data access requests attempted by the host computer system has exceeded a threshold value.

16. The method of claim 1, further comprising:

encrypting data transmitted between the host computer system and the DSD; and
decrypting the encrypted data, by the host computer system and/or the DSD.

17. A data storage device (DSD) comprising:

a non-volatile storage medium configured to store data, wherein the non-volatile storage medium is further configured to store a plurality of blocks;
a data path configured to transmit at least data between the non-volatile storage medium and a host computer system; and
one or more processors, individually or in combination, configured to:
receive, from the host computer system, an initial read request to read a block of the plurality of blocks;
send, responsive to receiving the initial read request, information from the block to the host computer system;
iteratively receive, from the host computer system and in a predetermined order, subsequent read requests to read each subsequent block of the plurality of blocks based on the information sent from the block of a previous response, wherein:
the predetermined order is one of a plurality of permutations; and
each permutation indicates a different order for traversing the plurality of blocks;
send, in each iteration, information from the subsequent block to the host computer system;
terminate the iterations in response to determining that each block of the plurality of blocks has been read; and
determine the host computer system is authenticated in response to determining one or more conditions are met, wherein the one or more conditions include determining that each block of the plurality of blocks has been read.

18. A computer-implemented method configured to be performed by a host computer system for authenticating the host computer system to access a data storage device (DSD) comprising a non-volatile storage medium including a plurality of blocks, wherein the computer-implemented method comprises:

sending, to the DSD, an initial read request to read a block of the plurality of blocks;
receiving, responsive to the initial read request, information from the block;
retrieving, using the information from the block, an address of a subsequent block of the plurality of blocks;
iteratively sending, to the DSD and in a predetermined order, subsequent read requests to read each subsequent block of the plurality of blocks based on the information received from the block of a previous response, wherein:
the predetermined order is one of a plurality of permutations; and
each permutation indicates a different order for traversing the plurality of blocks;
receiving, in each iteration, information from the subsequent block; and
terminating the iterations in response to the DSD determining that each block of the plurality of blocks has been read, wherein the DSD is configured to determine the host computer system is authenticated in response to determining one or more conditions are met, wherein the one or more conditions include the DSD determining that each block of the plurality of blocks has been read.

19. A data storage device (DSD) comprising:

a non-volatile storage medium configured to store data in a plurality of blocks;

a data path configured to transmit at least data between a host computer system and the data storage device;

means, stored in memory for execution by at least one processor, for receiving, from the host computer system, an initial read request to read a block of the plurality of blocks;

means, stored in the memory for execution by the at least one processor, for and in response sending information from the block to the host computer system;

means, stored in the memory for execution by the at least one processor, for iteratively receiving, from the host computer system, subsequent read requests to read each subsequent block of the plurality of blocks based on the information sent from the block of a previous response;

means, stored in the memory for execution by the at least one processor, for sending, in each iteration, information from the subsequent block to the host computer system, wherein:

the host computer system is configured to use a combined key based on the information from the subsequent block to retrieve an address of a next subsequent block of the plurality of blocks; and the combined key is based on combination information on a channel, a die, a plane, and the next subsequent block in the non-volatile storage medium;

means, stored in the memory for execution by the at least one processor, for terminating the iterations in response to determining that each block of the plurality of blocks has been read; and means, stored in memory for execution by at least one processor, for determining the host computer system is authenticated in response to determining one or more conditions are met, wherein the one or more conditions include determining that each block of the plurality of blocks has been read.

20. A data storage device comprising:

a non-volatile storage medium configured to store data in a plurality of blocks;

a data path configured to transmit data between a host computer system and the non-volatile storage medium; and one or more processors, individually or in combination, configured to:

receive, from the host computer system, an initial read request to read a block of the plurality of blocks;

send, responsive to the initial read request, information from the block to the host computer system;

iteratively receive, from the host computer system, subsequent read requests to read each subsequent block of the plurality of blocks based on the information sent from the block of a previous response;

send, in each iteration, information from the subsequent block to the host computer system, wherein:

the host computer system is configured to use a combined key based on the information from the subsequent block to retrieve an address of a next subsequent block of the plurality of blocks; and the combined key is based on combination information on a channel, a die, a plane, and the next subsequent block in the non-volatile storage medium;

terminate the iterative process in response to determining that each block of the plurality of blocks has been read; and determine, responsive to determining that each block of the plurality of blocks has been read, that the host computer system is authenticated.

* * * * *